Nov. 22, 1960 W. G. HEAPHY 2,961,259
CONNECTING MEANS FOR SCAFFOLDING OR THE LIKE
Filed June 29, 1959
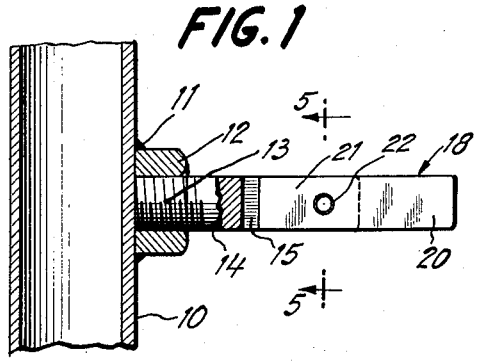
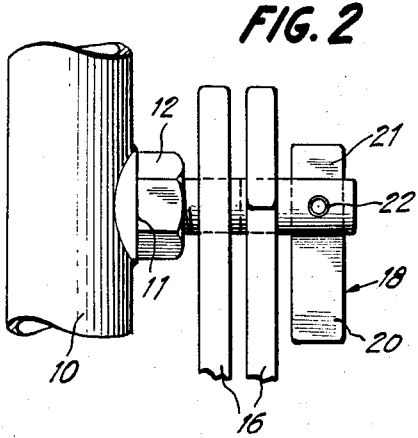
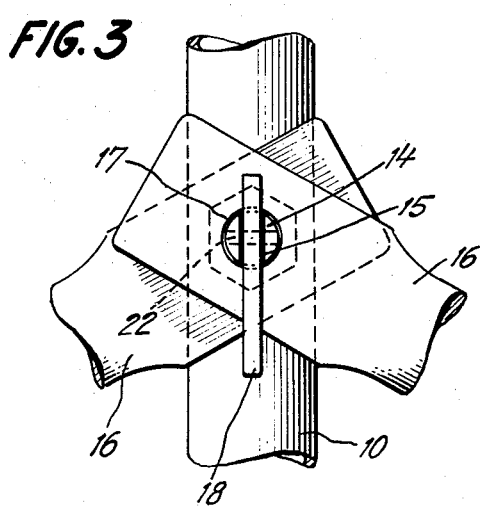
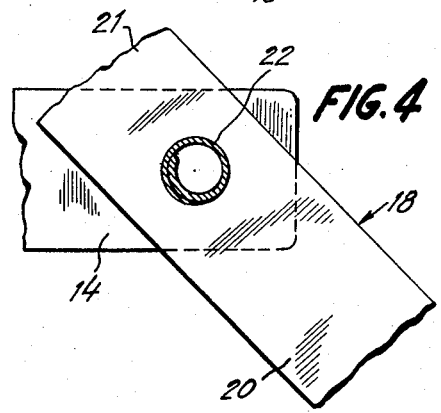
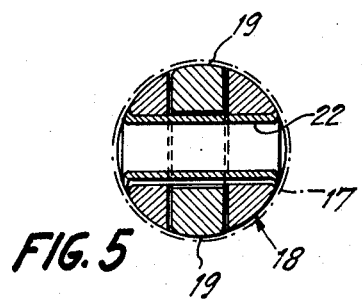
INVENTOR.
WILLIAM G. HEAPHY
BY

United States Patent Office 2,961,259
Patented Nov. 22, 1960

2,961,259

CONNECTING MEANS FOR SCAFFOLDING OR THE LIKE

William G. Heaphy, 24 Powder Horn Hill, Wilton, Conn.

Filed June 29, 1959, Ser. No. 823,420

1 Claim. (Cl. 287—53.5)

This invention relates to scaffolding and in particular to latch means for securing the upright and lateral bracing members together.

In scaffolding, that is usually erected on the job, a number of factors are involved that require the parts to be made in as few pieces as possible so that danger of loss is reduced to a minimum and the time of assembly shortened. The parts of the structure usually are delivered to a job and lie out on the ground before erection with the result that rusting occurs, the parts get crusted with dirt and assembly of the parts is impeded or is rendered difficult particularly as the working men wear heavy canvas gloves for the protection of their hands.

The objects of the invention therefore are; to provide a parts joining member that can be readily replaced without dismantling the scaffold; to provide a connector in the nature of a latch member that can be manipulated by a workman wearing gloves; to provide a connector that requires a minimum of manipulation in assembling the parts; to provide a connector that will automatically assume a holding position when the braces are placed thereon and to provide a connector latch that has a minimum number of parts.

Other objects and structural details of the invention will be apparent from the following description when read in connection with the accompanying drawing, in which:

Fig. 1 is a vertical section taken through a part of an upright pipe of a scaffold showing the application thereto of the connector latch means, the latter being shown in nonlatching position.

Figure 2 is a full view similar to Figure 1 showing the upper ends of the cross braces of a scaffold in place on the connector with the latch portion in brace securing position, Figure 3 is an end view of the connecting means illustrated in Figure 2 and showing the relative location of the parts, Figure 4 is an enlarged section taken through the slotted portion of the stud and illustrating the pivot means upon which the latch piece is mounted, and Figure 5 is an enlarged section taken on the line 5—5 of Figure 1 showing the parts of the connector in assembled relation.

Referring to the drawing in detail, 10 indicates a pipe or tubular form of upright used in knock-down scaffolding to which is welded as at 11, or otherwise secured, a standard hexagon nut 12. This nut may be round or square or any desired shape and is thick enough to provide a solid anchorage for the threaded end 13 of a stud 14 having a vertical slot 15 extending inwardly from the outer free end thereof. The stud 14 at its inner threaded end abuts the pipe 10. The stud 14, thus held, is arranged to receive the ends of cross-braces 16 having suitable openings 17 therein for close fit about the stud so that a minimum of play is permitted.

The slot is arranged to have pivotally mounted therein a latch piece or retainer 18 which is rounded on its outer edges 19 (Fig. 5) to conform to the outer contour of the stud so that the cross-braces can be slid thereover without interference. This shape of the edges of the latch piece 18 makes is possible to have a hole of minimum size in the ends of the cross-braces to provide a more stable structure. The latch piece is pivoted in the stud beyond its longitudinal center so that one portion 20 of said latch piece 18 is longer than the other portion 21 and acts as a weighted end to cause the latch to assume automatically a vertical latching or retaining position, as shown in Figure 2, after the ends of the cross braces are positioned over the stud. When it becomes necessary to replace the stud, the latch piece serves as a turning member whose turning force is increased by use of the elongated portion 20 in manual operation, thus eliminating the need for tools to thread the stud into the nut. In assembling the latch in the stud, use is made of a helically wound strip of metal of tubular shape constituting a rivet 22 which is self binding in that it is driven through the hole in the stud and contacts to fit tightly and without the need of providing headed or specially formed ends, thus reducing the cost of producing the connector, which costs are further reduced by providing a connector made of standard nut and bar stock. The latch piece swings freely on the rivet 22 and is moved to the Figure 1 position to allow the ends of the cross bracer 16 to be slipped over the stud 14 and the latch piece 18, after which the latter drops to the Figure 2 position to imprison the ends of the braces. Because of the arrangement of the parts there is nothing to get lost, the latch and stud combination can be mounted by manual twisting action and the latch can be manipulated by a workman wearing clumsy canvas gloves, which is common in the building trades. The replacement of the stud is facilitated by the latch piece 18 serving as a cross piece through which turning force can be exerted manually.

While I have shown and described what I consider to be a highly desirable embodiment of my invention, it is obvious that changes in form could be made without departing from the spirit of my invention, and I, therefore do not limit myself to the exact form herein shown and described, nor to anything less than the whole of my invention as hereinbefore set forth and as hereinafter claimed.

What I claim as new and desire to secure by Letters Patent is:

The combination with the upright pipe section of a support for scaffolding including pipe sections and cross braces therefor, of an internally threaded nut or the like welded to said upright pipe section, a cylindrical stud threaded at one end for threaded engagement with the nut and having an open ended slot at the opposite outer free end thereof, said slot being disposed in vertical position when the stud is horizontally threaded into the nut to abut said pipe section and said stud being arranged to receive the perforated ends of cross-braces, a cross-brace detaining latch means in said slot having its opposite edges conforming in contiguous contour with the outer surface of said stud whereby the stud and latch can readily pass through the openings in the ends of the cross-braces, rivet means comprising a helically coiled strip of material for retention in said stud solely by drive fit and for pivotally mounting the latch for free swinging movement in said slot, said latch means being pivoted to provide a shorter upper end and a longer lower end providing a gravity counterweight to maintain the latch means automatically in vertical cross-brace detaining position, and said latch means constituting a turning means for threading the stud into the nut and also the sole cross-brace holding means when the scaffolding is assembled.

References Cited in the file of this patent

UNITED STATES PATENTS

| | | |
|---|---|---|
| 1,112,622 | Jones | Oct. 6, 1914 |
| 2,025,004 | Shearer | Dec. 17, 1935 |
| 2,485,531 | Dzus et al. | Oct. 18, 1949 |
| 2,698,552 | Smith | Jan. 4, 1955 |
| 2,701,167 | Kirkpatrick | Feb. 1, 1955 |
| 2,708,606 | Schumacher | May 17, 1955 |
| 2,810,612 | Weisz | Oct. 22, 1957 |